United States Patent
Lee et al.

(10) Patent No.: US 11,429,210 B2
(45) Date of Patent: Aug. 30, 2022

(54) WIRELESS LIGHTING EFFECT CONFIGURATION DATA TRANSMISSION SYSTEM

(71) Applicant: Razer (Asia-Pacific) Pte. Ltd., Singapore (SG)

(72) Inventors: Kah Yong Lee, Singapore (SG); Chee Oei Chan, Singapore (SG); Gui Mei Dai, Singapore (SG)

(73) Assignee: Razer (Asia-Pacific) Pte. Ltd., Singapore (SG)

( * ) Notice: Subject to any disclaimer, the term of this patent is extended or adjusted under 35 U.S.C. 154(b) by 0 days.

(21) Appl. No.: 17/260,972

(22) PCT Filed: Jul. 23, 2018

(86) PCT No.: PCT/SG2018/050361
§ 371 (c)(1),
(2) Date: Jan. 15, 2021

(87) PCT Pub. No.: WO2020/022950
PCT Pub. Date: Jan. 30, 2020

(65) Prior Publication Data
US 2021/0318762 A1 Oct. 14, 2021

(51) Int. Cl.
*G09G 5/00* (2006.01)
*G06F 3/038* (2013.01)
(Continued)

(52) U.S. Cl.
CPC .......... *G06F 3/0383* (2013.01); *G06F 3/0231* (2013.01); *G06F 3/03543* (2013.01);
(Continued)

(58) Field of Classification Search
CPC .. G06F 3/0383; G06F 3/0231; G06F 3/03543; G06F 13/385; G06F 2203/0337;
(Continued)

(56) References Cited

U.S. PATENT DOCUMENTS

| | | | |
|---|---|---|---|
| 5,881,366 A | 3/1999 | Bodenmann et al. | |
| 7,015,833 B1 * | 3/2006 | Bodenmann | G06F 3/038 |
| | | | 341/20 |

(Continued)

FOREIGN PATENT DOCUMENTS

| WO | WO 2002/019630 A2 | 3/2002 |
|---|---|---|
| WO | WO 2011/130752 A1 | 10/2011 |

OTHER PUBLICATIONS

International Search Report and Written Opinion, dated Apr. 9, 2019, for the corresponding International Application No. PCT/SG2018/050361 in 8 pages.

(Continued)

*Primary Examiner* — Adam R. Giesy
(74) *Attorney, Agent, or Firm* — Polsinelli PC

(57) ABSTRACT

A method, a computer readable medium, and an apparatus for wireless communication are provided. The apparatus may receive, via a radio frequency channel, a first data from a first human interface device at a first time slot of a frame. The apparatus may transmit the first data to a computing device. The apparatus may receive, via the radio frequency channel, a second data from a second human interface device at a second time slot of the frame. The apparatus may transmit the second data to the computing device. The apparatus may transmit, via the radio frequency channel at a third time slot of the frame, at least one of a first acknowledgment to the first data, a first lighting effect configuration data for the first human interface device, a second acknowledgment to the second data, or a second lighting effect configuration data for the second human interface device.

20 Claims, 13 Drawing Sheets

(51) Int. Cl.
*H05B 47/19* (2020.01)
*G06F 3/023* (2006.01)
*G06F 3/0354* (2013.01)
*G06F 13/38* (2006.01)

(52) U.S. Cl.
CPC ........... *G06F 13/385* (2013.01); *H05B 47/19* (2020.01); *G06F 2203/0337* (2013.01); *G06F 2203/0384* (2013.01)

(58) Field of Classification Search
CPC .. G06F 2203/0384; G06F 3/038; G06F 3/023; G06F 3/033; H05B 47/19; H05B 45/20
See application file for complete search history.

(56) References Cited

U.S. PATENT DOCUMENTS

| | | | |
|---|---|---|---|
| 7,024,501 B1 | 4/2006 | Wright | |
| 7,480,268 B2 | 1/2009 | Jain | |
| 2005/0090200 A1 | 4/2005 | Karaoguz et al. | |
| 2005/0243058 A1* | 11/2005 | Morris | H04W 52/04 345/158 |
| 2006/0035590 A1 | 2/2006 | Morris et al. | |
| 2007/0019771 A1 | 1/2007 | Ambuehl et al. | |
| 2007/0038785 A1 | 2/2007 | Varanda et al. | |
| 2008/0175207 A1 | 7/2008 | Lee | |
| 2012/0156993 A1 | 6/2012 | Seo et al. | |
| 2013/0191554 A1 | 7/2013 | Junge et al. | |

OTHER PUBLICATIONS

Extended European Search Report dated Jun. 25, 2021, 11 pages, for the corresponding European Patent Application No. 18928114.0.

Benjamin F. Janzen et al., "Is 60 FPS Better than 30? The Impact of Frame Rate and Latency on Moving Target Selection." CHI 2014, One of a CHInd, Toronto, ON, Canada, CHI 14 Extended Abstracts on Human Factors in Computing Systems. 2014. 1477-1482.

Denis Barberena, et al. "Optical Verification of Mouse Event Accuracy." In 5 pages, 2016.

Alienware AW568 Advanced Gaming Mechanical Keyboard + AW958 Elite 12000 DPI Gaming Mouse, (https://www.ipohonline.biz/alienware-aw568-advanced-gaming-keyboard-and-elite-gaming-mouse-combo), ipohonline.biz Marketplace Solution Provider in 14 pages; 2018.

Mark Beaumont et al., "The Cross Domain Desktop Compositor: Using hardware-based video compositing for a multi-level secure user interface." Proceedings of the 32nd Annual Conference on Computer Security Applications. 2016 in 13 pages.

* cited by examiner

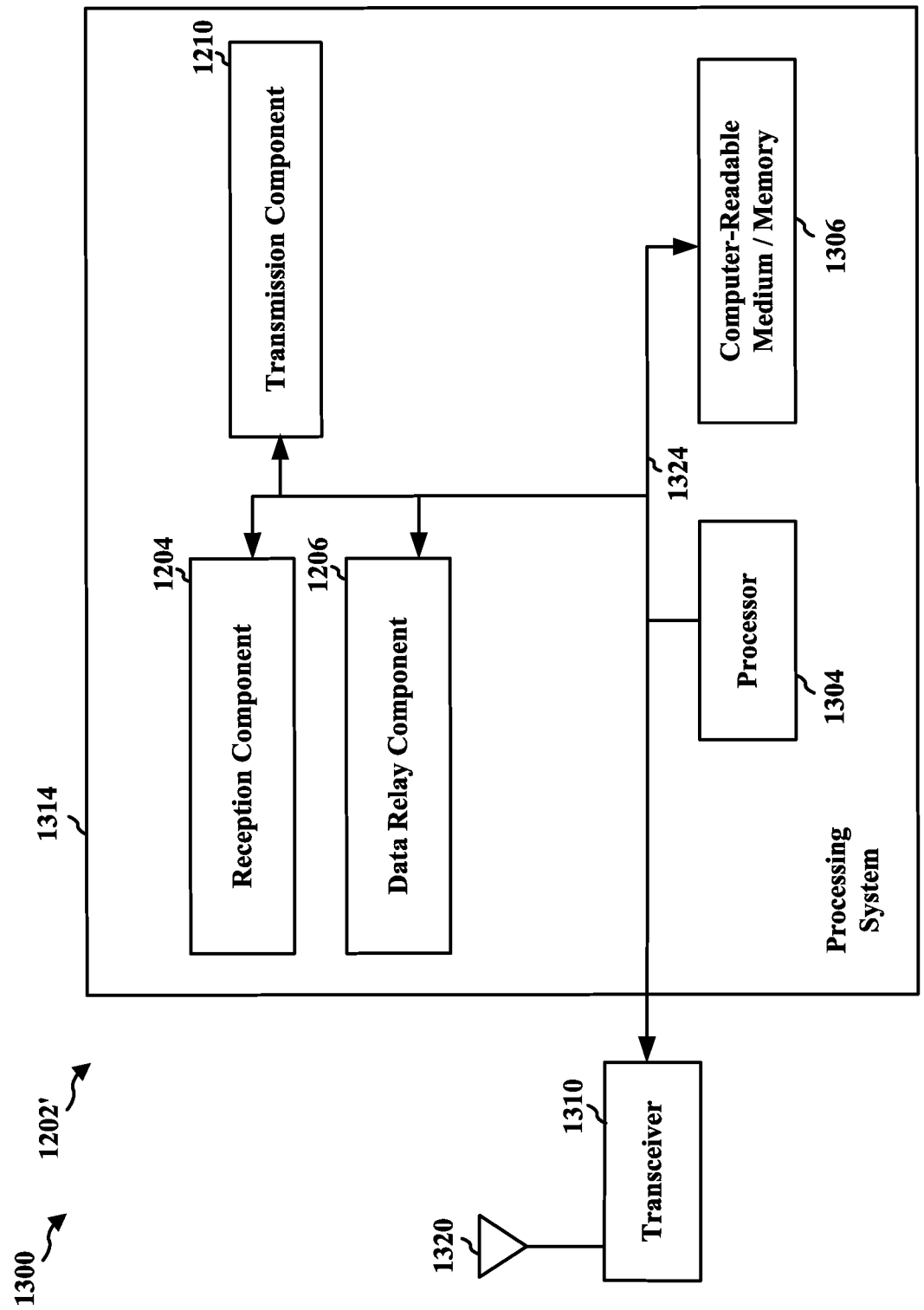

WIRELESS LIGHTING EFFECT CONFIGURATION DATA TRANSMISSION SYSTEM

TECHNICAL FIELD

Various aspects of this disclosure generally relate to wireless communication systems, and more particularly, to a wireless lighting effect configuration data transmission system.

BACKGROUND

A human interface device (HID) is a type of computer device usually used by humans that takes input from humans and gives output to humans. Common human interface devices may include keyboard, pointing devices (e.g., mouse, trackball, touchpad, pointing stick, light pen), touchscreen, magnetic stripe reader, graphics tablet, joystick, gamepad, analog stick, webcam, fingerprint scanner, etc. A dongle is a small piece of hardware that connects to a computing device to provide the computing device with additional functionality (e.g., wireless connectivity to human interface devices).

A wireless mouse may transmit data via infrared radiation (IR) or radio (e.g., Bluetooth and Wi-Fi). The receiver of a wireless mouse may be a dongle that is connected to the computer through a serial or USB port, or can be built in. A wireless keyboard is a computer keyboard that allows the user to communicate with computers, tablets, or laptops with the help of radio frequency (RF) or infrared radiation technology. A wireless keyboard may be connected using RF technology using a transmitter and a receiver. The radio transmitter may be inside the wireless keyboard. The radio receiver may be a dongle that is plugged into a keyboard port or USB port. Once the receiver and transmitter are plugged in, the computer recognizes the wireless keyboard as if it were connected via a cable.

The wireless mouse and the wireless keyboard may use light-emitting diode (LED) components to present lighting effect. In traditional wireless mouse and wireless keyboard architecture, there may be a dedicated USB dongle associated to each HID device. The wireless mouse and the wireless keyboard may support wireless Chroma function. That is, the wireless mouse and the wireless keyboard may adjust their lighting effect based on configuration data received from their respective USB dongle. The wireless mouse and the wireless keyboard operate independently from each other.

FIG. 1A is a diagram illustrating an example of a traditional system 100 that includes a wireless mouse 106 and a wireless keyboard 104. In the example, the wireless mouse 106 is connected to a computing device 102 through a USB dongle 110, the wireless keyboard 104 is connected to the computing device 102 through a USB dongle 108. The USB dongle 110 is the receiver of the wireless mouse 106, and the USB dongle 108 is the receiver of the wireless keyboard 104.

The wireless mouse 106 and the wireless keyboard 104 may interfere with each other as the RF transmission is not coordinated. The close proximity of the dongles 108 and 110 may create unwanted RF degradation to the systems, which is known as power blocking. In addition, two USB ports of the computing device 102 are occupied as each HID device needs one USB dongle.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a system and a method to transmit lighting effect configuration data to multiple human interface devices (HID) using a single dongle (e.g., a USB dongle) are provided. The system and the method allow two input devices (e.g., a wireless mouse and a wireless keyboard) to communicate with a single dongle on one communication channel. The performance of the two input devices is on-par with wired devices. The wireless system may divide the channel bandwidth into transmission timeslots, and dedicated timeslots may be allocated to input devices for data transmission, and the acknowledgement and lighting effect configuration data may be returned to the input devices in a common slot.

In another aspect of the disclosure, a method, a computer readable medium, and an apparatus for wireless communication are provided. The apparatus may be a dongle. The apparatus may receive, via a radio frequency channel, a first data from a first human interface device at a first time slot of a frame. The apparatus may transmit the first data to a computing device coupled to the apparatus. The apparatus may receive, via the radio frequency channel, a second data from a second human interface device at a second time slot of the frame. The apparatus may transmit the second data to the computing device. The apparatus may transmit, via the radio frequency channel at a third time slot of the frame, at least one of a first acknowledgment to the first data, a first lighting effect configuration data for the first human interface device, a second acknowledgment to the second data, or a second lighting effect configuration data for the second human interface device.

To the accomplishment of the foregoing and related ends, the one or more aspects include the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 13 is a diagram illustrating an example of a hardware implementation for an apparatus employing a processing system.

DETAILED DESCRIPTION

Figure 1B:
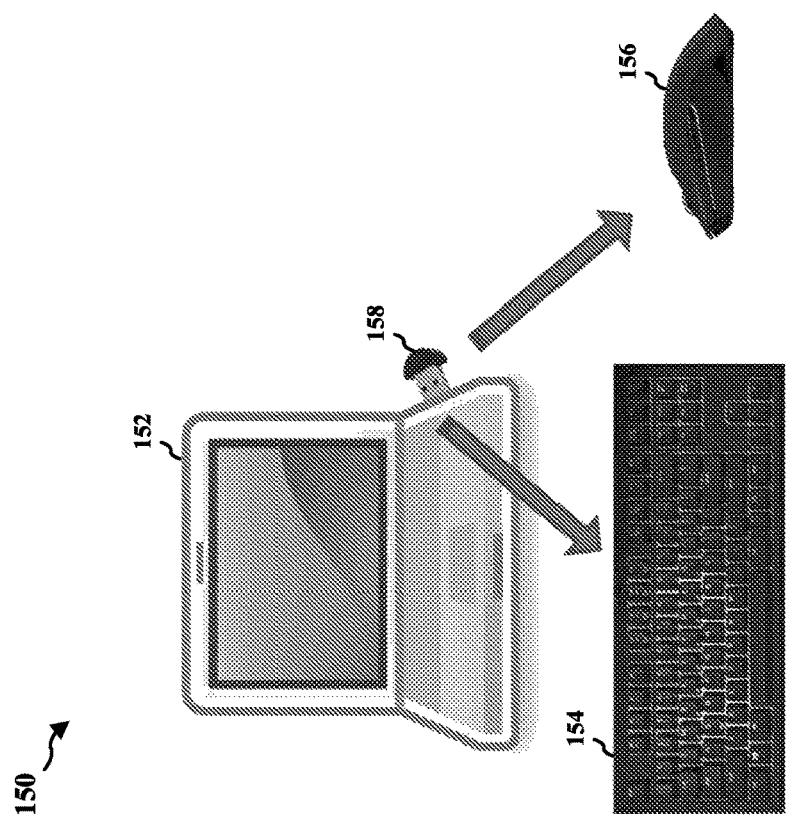
FIG. 1B is a diagram illustrating an example of a data transmission system that includes a wireless mouse and a wireless keyboard.
Figure 1A:
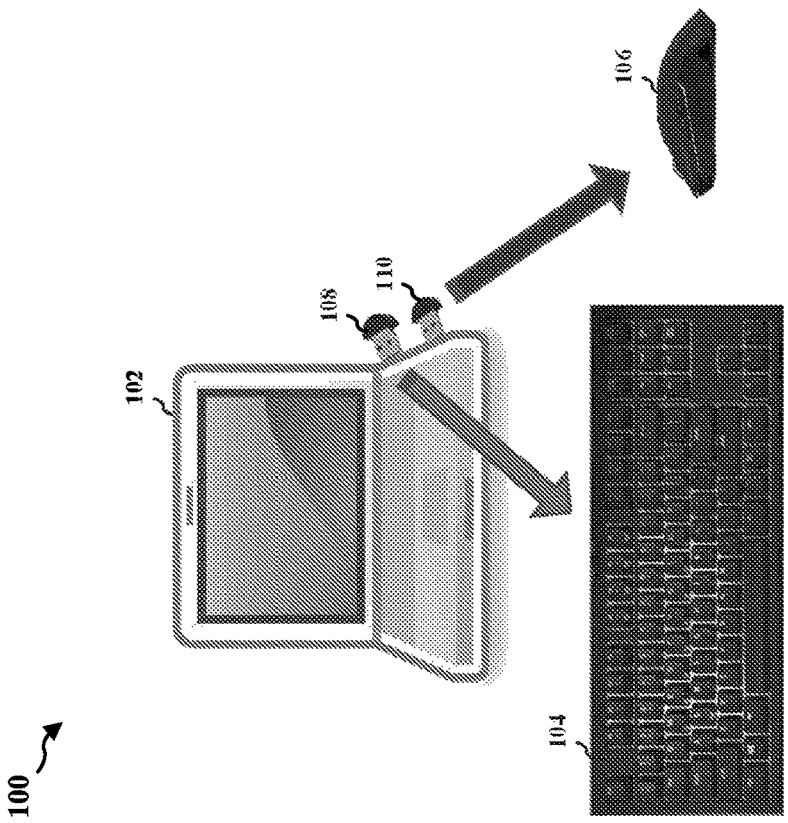
FIG. 1A is a diagram illustrating an example of a traditional system that includes a wireless mouse and a wireless keyboard.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of a wireless communication system will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media may include a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1B is a diagram illustrating an example of a data transmission system 150 that includes a wireless mouse 156 and a wireless keyboard 154. In the example, both the wireless mouse 156 and the wireless keyboard 154 are connected to a computing device 152 through a shared USB dongle 158. The USB dongle 158 is the receiver of both the wireless mouse 156 and the wireless keyboard 154.

The data transmission system 150 makes use of a single USB dongle 158 to communicate with the wireless mouse 156 and the wireless keyboard 154 concurrently. The wireless mouse 156 may upload mouse data that includes movement and button status to the USB dongle 158 at the radio frequency of 1000 Hz. The wireless keyboard 154 may upload keys pressed status to the USB dongle 158 at the radio frequency of 1000 Hz. The USB dongle 158 may download lighting effect configuration data to the wireless mouse 156 and the wireless keyboard 154 concurrently at the frequency of 30 frames per second. Each transmission may be completed in a given time slot.

In some embodiments, a data transmission system may include a USB dongle, which may be able to support two or more human interface devices (e.g., one wireless mouse and one wireless keyboard) concurrently. In some embodiments, the human interface devices may transmit HID data to the USB dongle at the radio frequency of 1000 Hz. In some embodiments, the USB dongle may stream HID lighting effect configuration data (may be referred to as Chroma data) to the human interface devices at the frequency of 30 frames per second. The human interface devices may use the HID lighting effect configuration data to adjust their respective lighting effect.

Figure 2:
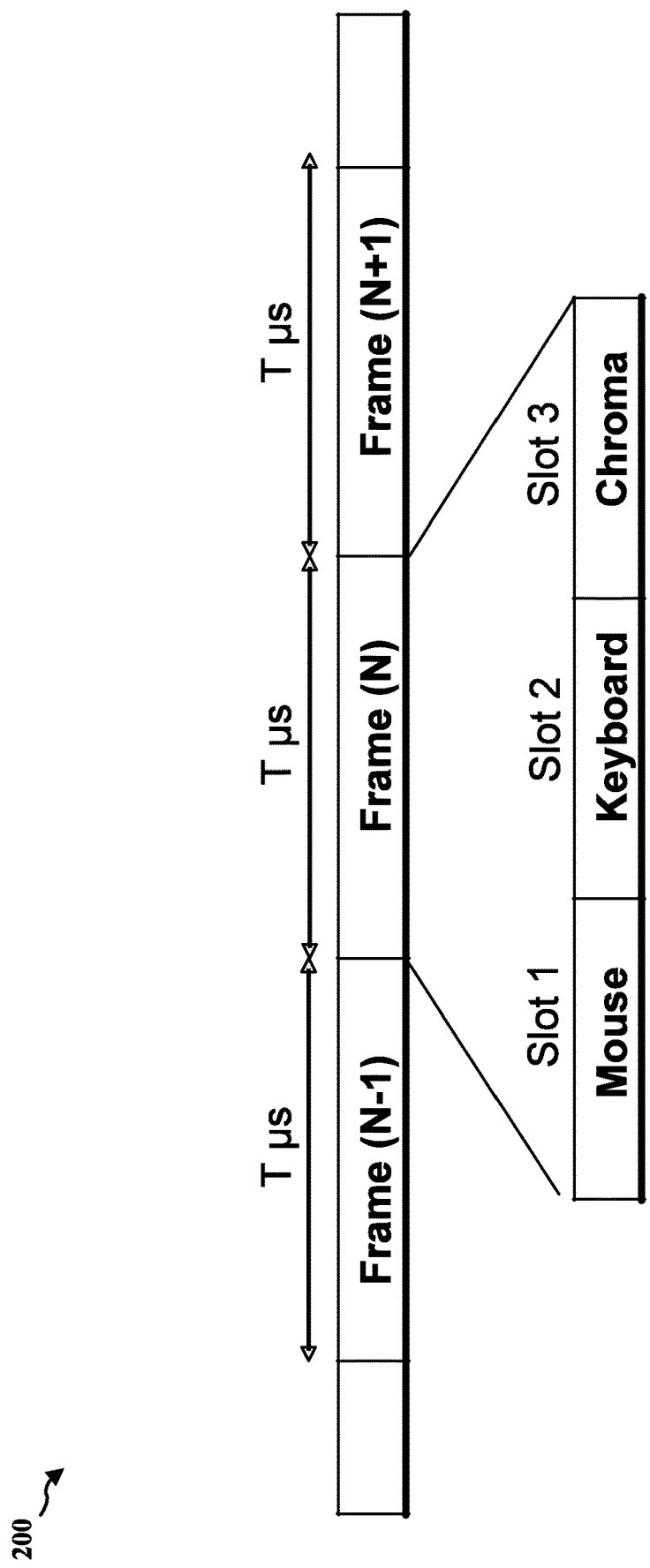
FIG. 2 is a diagram illustrating an example of an architecture for data transmission between a dongle and two human interface devices (e.g., a wireless mouse and a wireless keyboard).

FIG. 2 is a diagram 200 illustrating an example of an architecture for data transmission between a dongle and two human interface devices (e.g., a wireless mouse and a wireless keyboard). In the example, data transmission is divided into frames of T (microsecond). Each frame may be sub-divided into three time slots for mouse, keyboard, and Chroma data. The duration of each time slot may be allocated according to the data bandwidth required by the function associated with the time slot.

In some embodiments, at the start of each frame, the dongle may enter receive mode (RX) in order to receive data from mouse and keyboard respectively. The dongle may stay at the receive mode for two time slots (slot 1 and slot 2). The dongle may change to transmit mode (TX) at slot 3 in order to transmit acknowledgment (ACK) and Chroma data to the mouse and/or keyboard.

One of ordinary skill in the art would realize that each frame may be sub-divided into N time slots, N being greater than or equal to three. Among the N time slots, N−1 time slots may be used to receive data from N−1 human interface devices, which may work concurrently with a computing device via a dongle coupled to the computing device. One time slot may be used to transmit ACK and Chroma data from the dongle to the N−1 human interface devices.

Figure 3:
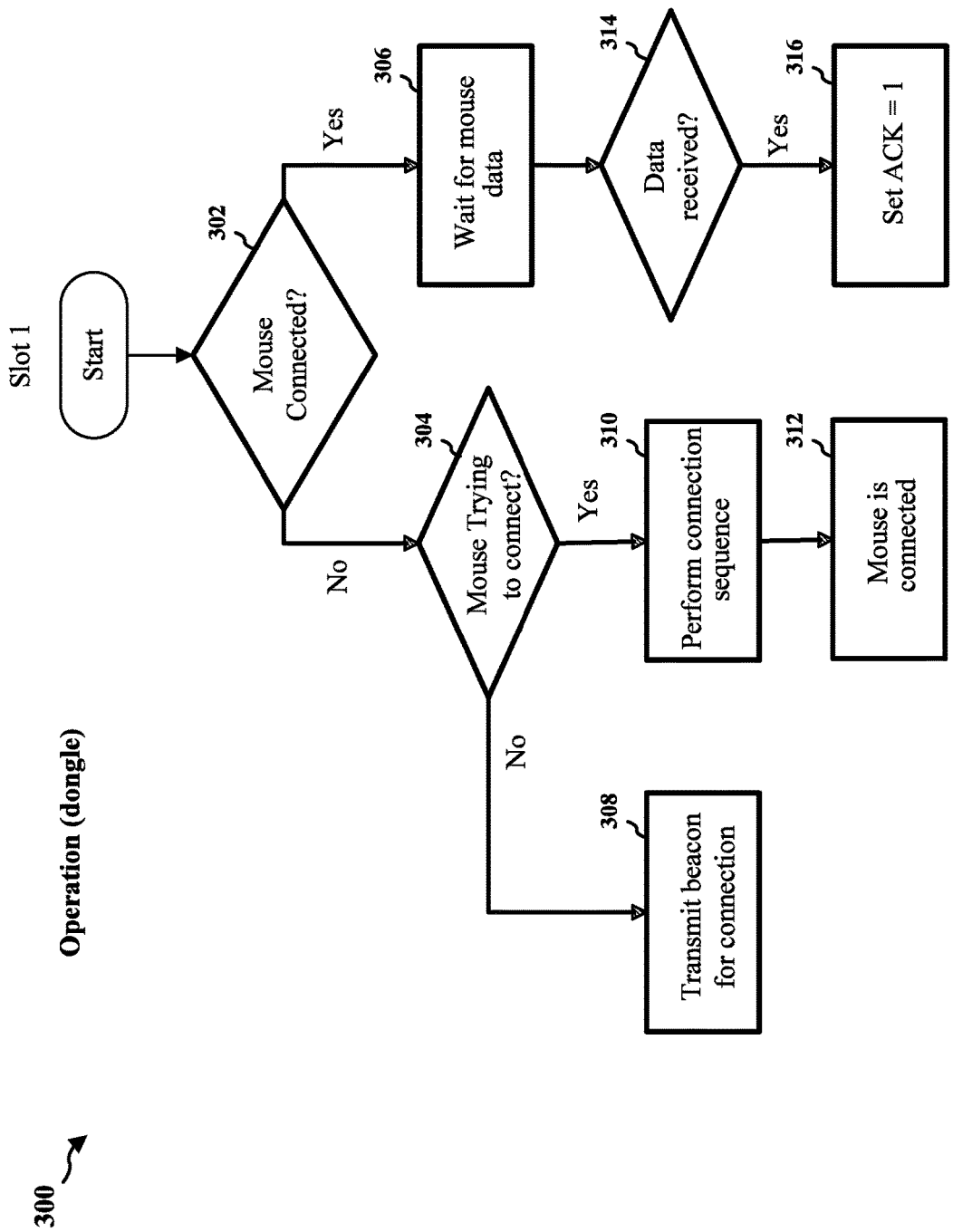
FIG. 3 is a flowchart of a method of operating a dongle at the first time slot in the data transmission system described above in FIG. 2.

FIG. 3 is a flowchart 300 of a method of operating a dongle at the first time slot in the data transmission system described above in FIG. 2. The method may be performed by an apparatus (e.g., apparatus 1202/1202' described below with reference to FIG. 12 or 13). The apparatus may be the dongle.

At 302, the apparatus may determine whether it is connected to a wireless mouse. If it is determined that the apparatus is connected to a wireless mouse, the apparatus may proceed to 306. If it is determined that the apparatus is not connected to a wireless mouse, the apparatus may proceed to 304.

At 306, the apparatus may wait for mouse data (e.g., data regarding the movement and button status of the wireless mouse) to arrive. At 314, the apparatus may determine whether the mouse data is received. If the mouse data is received, the apparatus may proceed to 316. At 316, the apparatus may set an acknowledgment flag for the mouse data.

At 304, the apparatus may determine whether a wireless mouse is trying to connect to the apparatus. If it is determined that a wireless mouse is trying to connect, the apparatus may proceed to 310. If it is determined that a wireless mouse is not trying to connect, the apparatus may proceed to 308.

At 310, the apparatus may perform a connection sequence to get connected with the wireless mouse. At 312, the apparatus is connected to the wireless mouse. At 308, the apparatus may transmit beacon for connection and synchronization with a wireless mouse.

Figure 4:
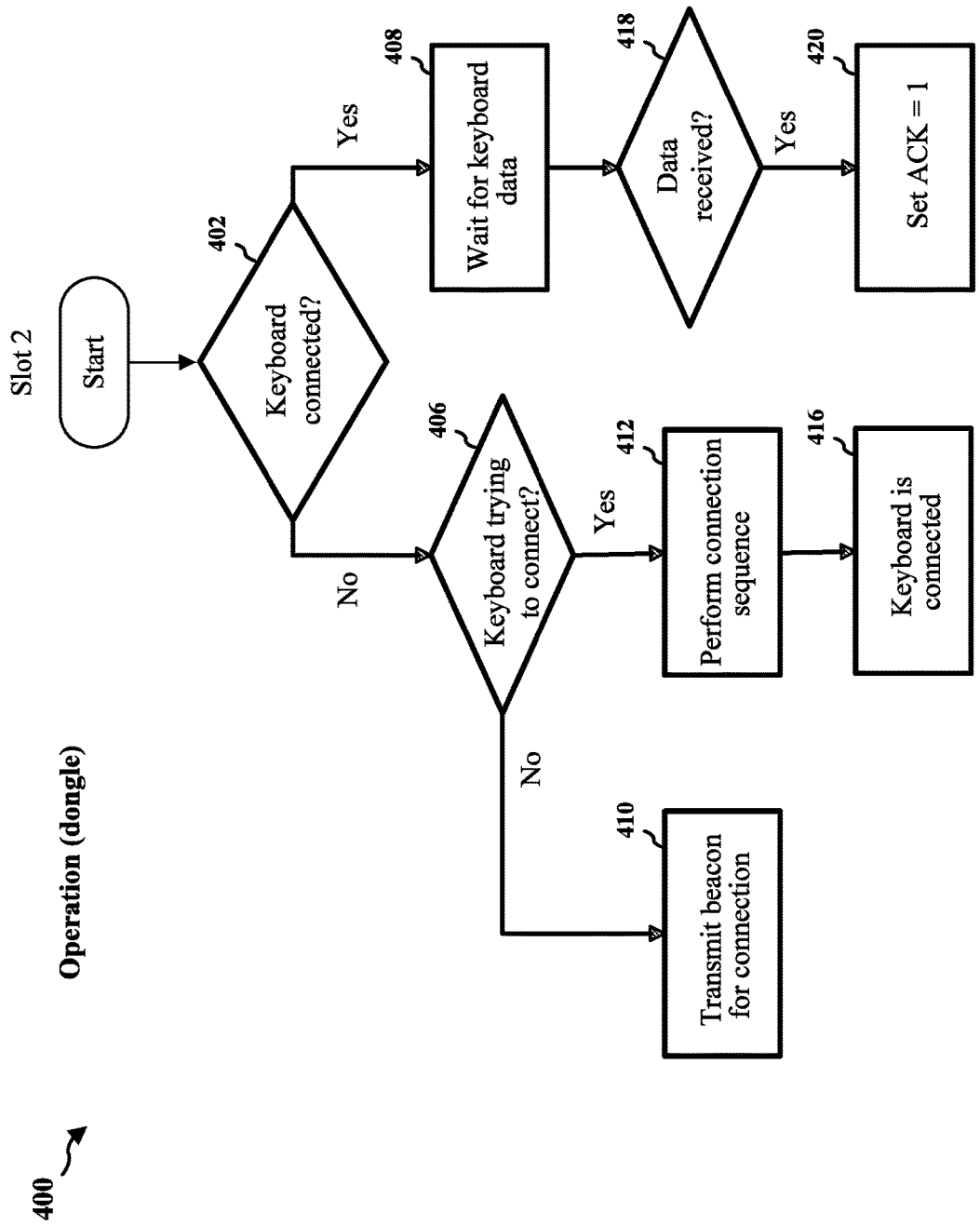
FIG. 4 is a flowchart of a method of operating a dongle at the second time slot in the data transmission system described above in FIG. 2.

FIG. 4 is a flowchart 400 of a method of operating a dongle at the second time slot in the data transmission system described above in FIG. 2. The method may be performed by an apparatus (e.g., apparatus 1202/1202' described below with reference to FIG. 12 or 13). The apparatus may be the dongle.

At 402, the apparatus may determine whether it is connected to a wireless keyboard. If it is determined that the apparatus is connected to a wireless keyboard, the apparatus may proceed to 408. If it is determined that the apparatus is not connected to a wireless keyboard, the apparatus may proceed to 406.

At 408, the apparatus may wait for keyboard data (e.g., data regarding keys pressed status of the wireless keyboard) to arrive. At 418, the apparatus may determine whether the keyboard data is received. If the keyboard data is received, the apparatus may proceed to 420. At 420, the apparatus may set an acknowledgment flag for the keyboard data.

At 406, the apparatus may determine whether a wireless keyboard is trying to connect to the apparatus. If it is determined that a wireless keyboard is trying to connect, the apparatus may proceed to 412. If it is determined that a wireless keyboard is not trying to connect, the apparatus may proceed to 410.

At 412, the apparatus may perform a connection sequence to get connected with the wireless keyboard. At 416, the apparatus is connected to the wireless keyboard. At 410, the apparatus may transmit beacon for connection and synchronization with a wireless keyboard.

Figure 5:
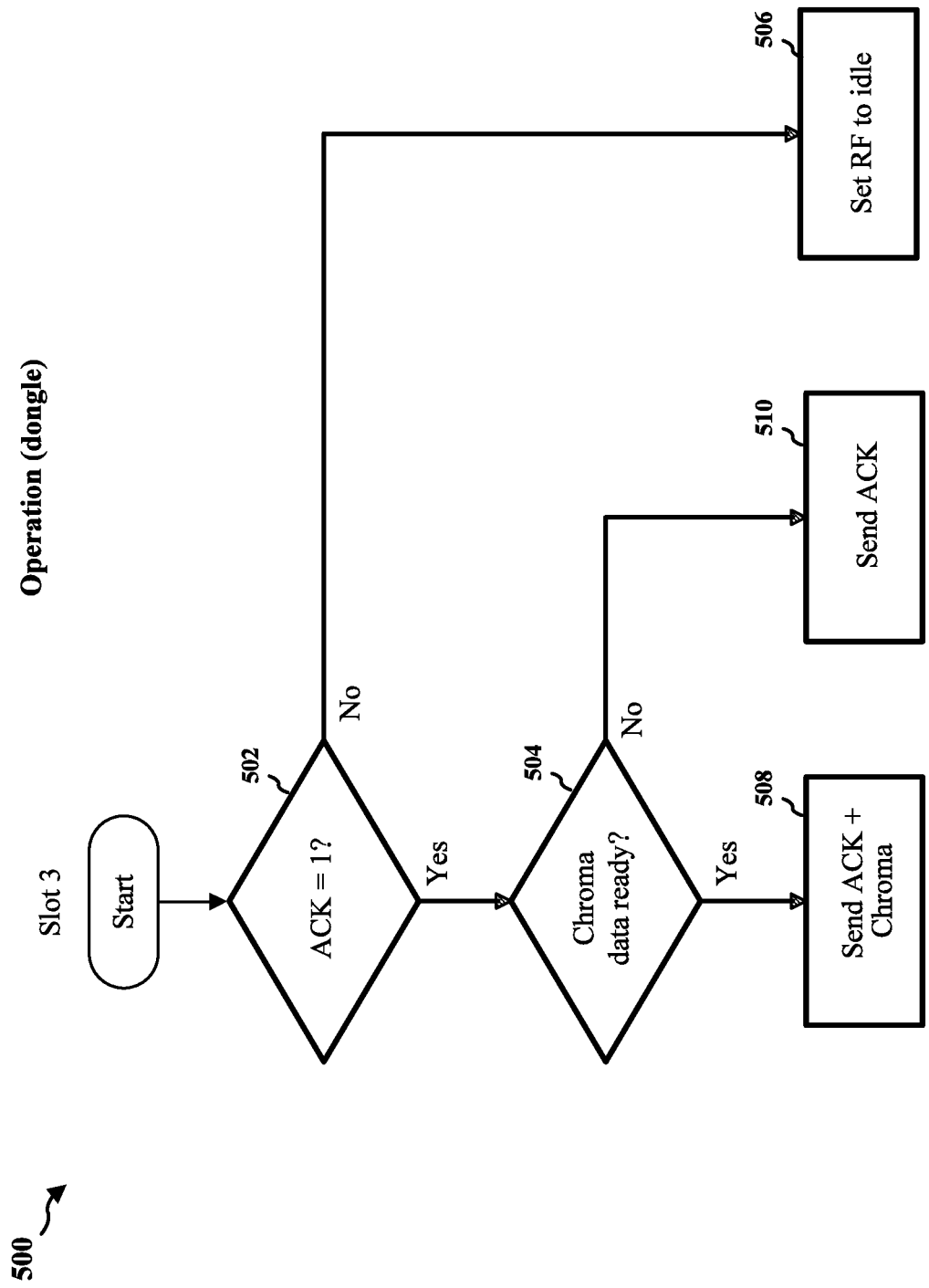
FIG. 5 is a flowchart of a method of operating a dongle at the third time slot in the data transmission system described above in FIG. 2.

FIG. 5 is a flowchart 500 of a method of operating a dongle at the third time slot in the data transmission system described above in FIG. 2. The method may be performed by an apparatus (e.g., apparatus 1202/1202' described below with reference to FIG. 12 or 13). The apparatus may be the dongle.

At 502, the apparatus may determine whether an acknowledgment flag for mouse data or keyboard data is set. If it is determined that an acknowledgment flag for mouse data or keyboard data is set, the apparatus may proceed to 504. If it is determined that no acknowledgment flag for mouse data or keyboard data is set, the apparatus may proceed to 506.

At 506, the apparatus may set RF to idle at the third time slot. At 504, the apparatus may determine whether Chroma data for the wireless mouse or wireless keyboard is ready. If the Chroma data for the wireless mouse or wireless keyboard is ready, the apparatus may proceed to 508. If no Chroma data for the wireless mouse or wireless keyboard is ready, the apparatus may proceed to 510.

At 508, the apparatus may send acknowledgement to the mouse data and/or the keyboard data, as well as Chroma data. At 510, the apparatus may send only acknowledgement to the mouse data and/or the keyboard data.

Figure 6:
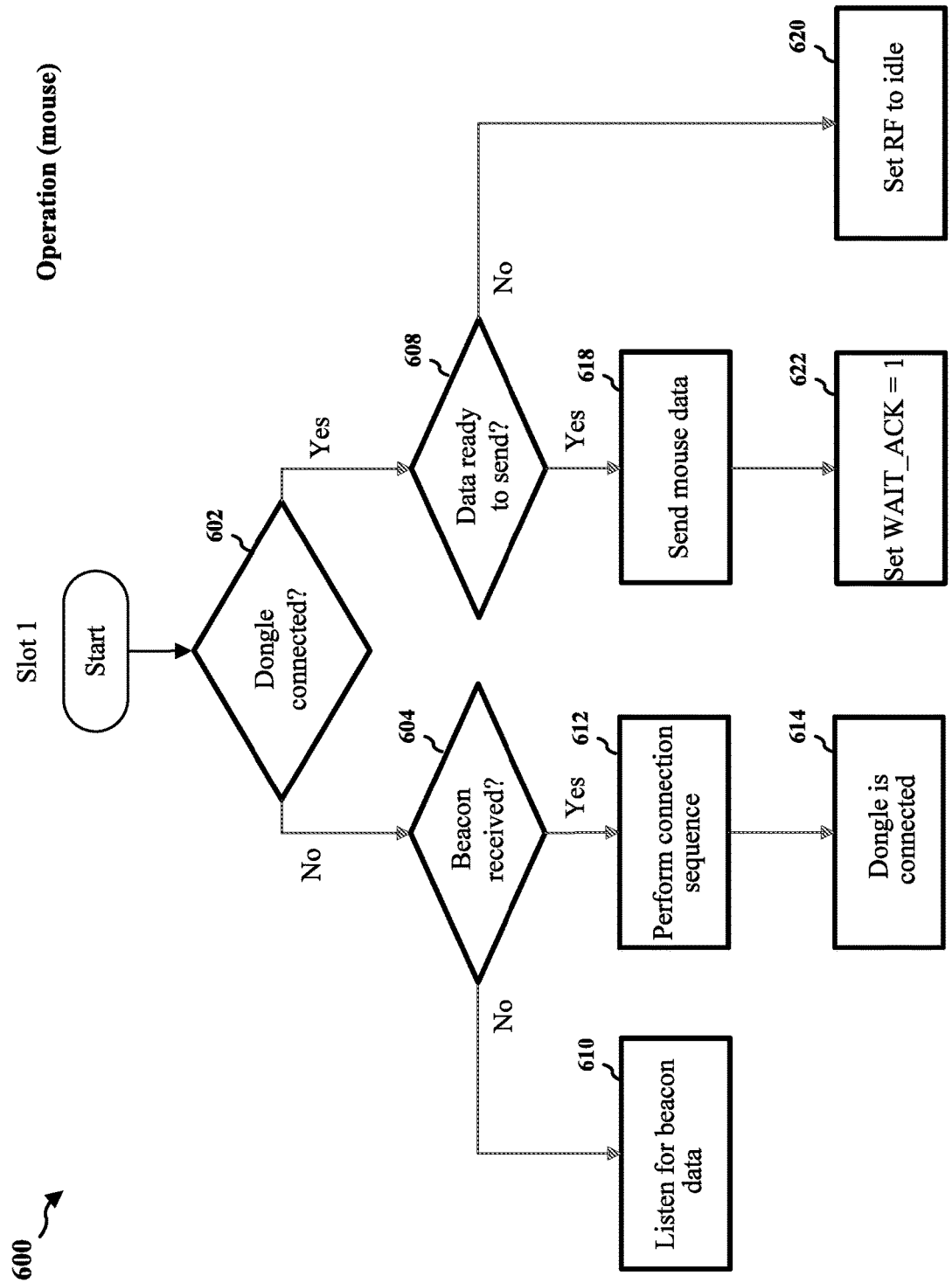
FIG. 6 is a flowchart of a method of operating a wireless mouse at the first time slot in the data transmission system described above in FIG. 2.

FIG. 6 is a flowchart 600 of a method of operating a wireless mouse at the first time slot in the data transmission system described above in FIG. 2. The method may be performed by the wireless mouse.

At 602, the mouse may determine whether it is connected to a dongle wirelessly. If it is determined that the mouse is connected to a dongle, the mouse may proceed to 608. If it is determined that the mouse is not connected to a dongle, the mouse may proceed to 604.

At 608, the mouse may determine whether mouse data (e.g., data regarding the movement and button status of the wireless mouse) is ready to send. If mouse data is ready to send, the mouse may proceed to 618. If mouse data is not ready to send, the mouse may proceed to 620.

At 618, the mouse may send mouse data to the dongle. At 622, the mouse may set a flag for waiting acknowledgment to the mouse data. At 620, the mouse may set RF to idle at the first time slot.

At 604, the mouse may determine whether a beacon is received. If a beacon is received, the mouse may proceed to 612. If a beacon is not received, the mouse may proceed to 610.

At 612, the mouse may perform a connection sequence to connect to the dongle. At 614, the mouse is connected to the dongle. At 610, the mouse may listen for beacon data.

Figure 7:
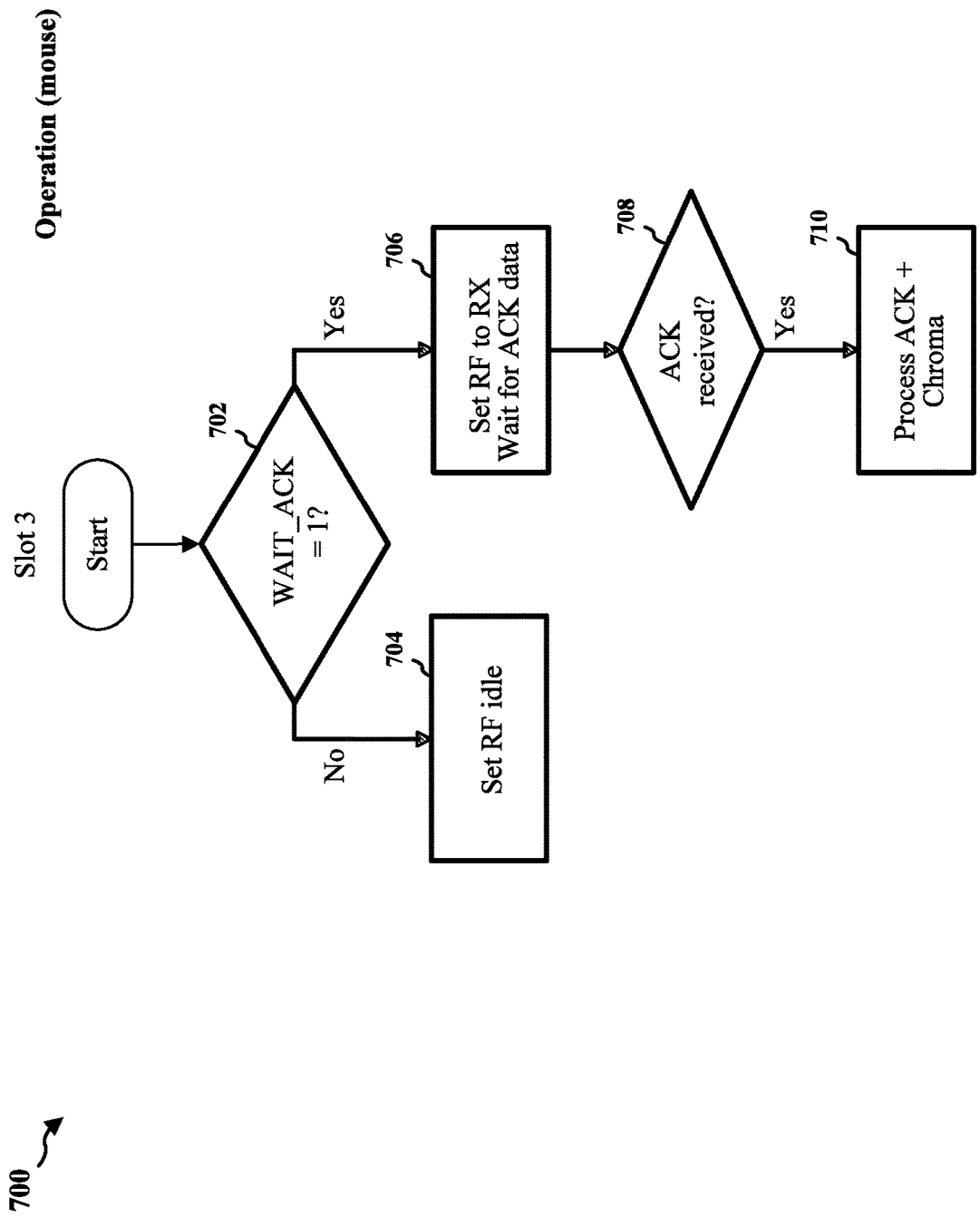
FIG. 7 is a flowchart of a method of operating a wireless mouse at the third time slot in the data transmission system described above in FIG. 2.

FIG. 7 is a flowchart 700 of a method of operating a wireless mouse at the third time slot in the data transmission system described above in FIG. 2. The method may be performed by the wireless mouse.

At 702, the mouse may determine whether the flag for waiting acknowledgment is set. If the flag for waiting acknowledgment is set, the mouse may proceed to 706. If the flag for waiting acknowledgment is not set, the mouse may proceed to 704.

At 706, the mouse may set RF to receive mode and wait for the acknowledgment data. At 708, the mouse may determine whether acknowledgment is received. If acknowledgment is received, the mouse may proceed to 710. At 710, the mouse may process the received acknowledgment and Chroma data for the mouse. At 704, the mouse may set RF to idle at the third time slot.

Figure 8:
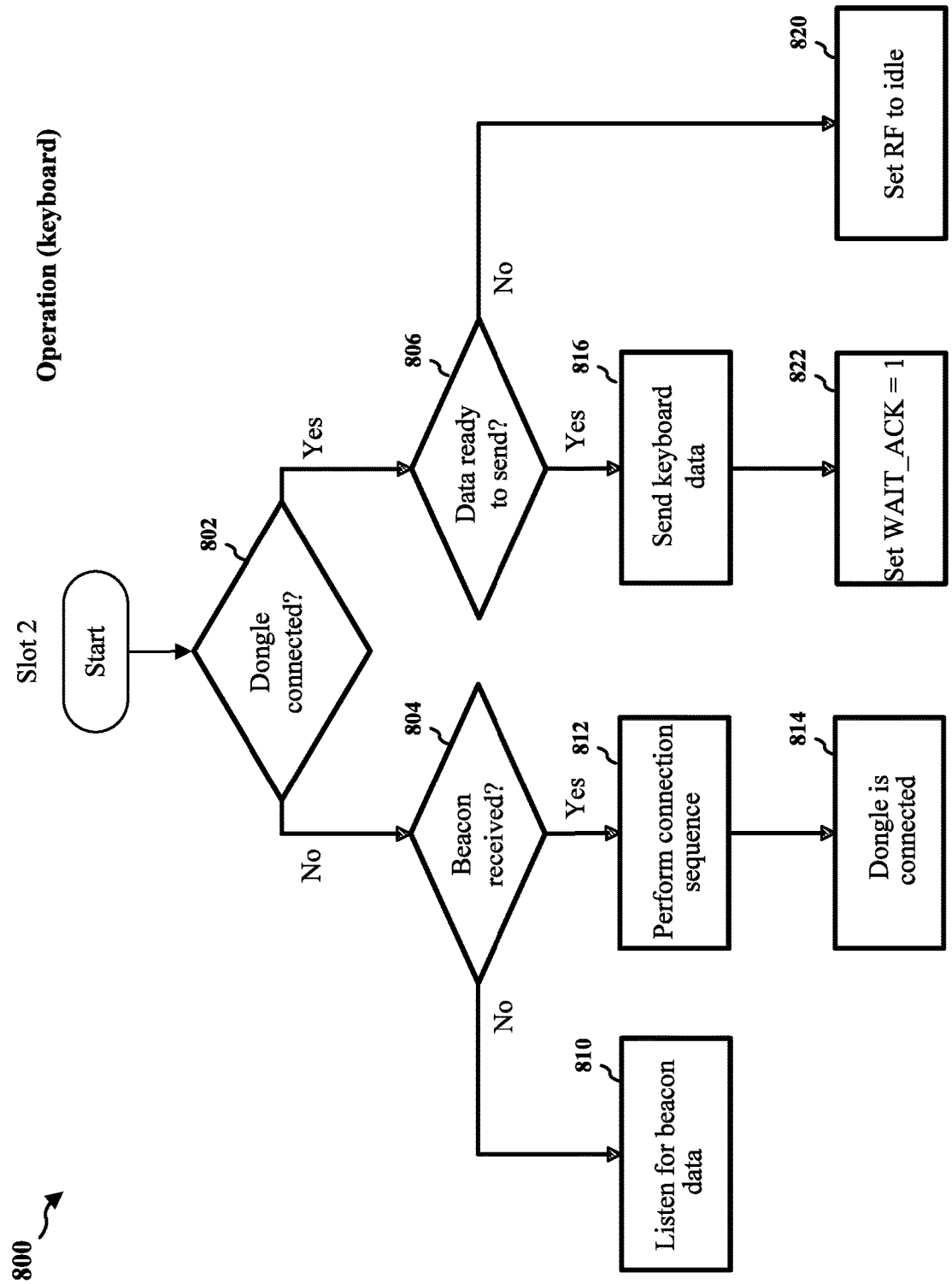
FIG. 8 is a flowchart of a method of operating a wireless keyboard at the second time slot in the data transmission system described above in FIG. 2.

FIG. 8 is a flowchart 800 of a method of operating a wireless keyboard at the second time slot in the data transmission system described above in FIG. 2. The method may be performed by the wireless keyboard.

At 802, the keyboard may determine whether it is connected to a dongle wirelessly. If it is determined that the keyboard is connected to a dongle, the keyboard may proceed to 806. If it is determined that the keyboard is not connected to a dongle, the keyboard may proceed to 804.

At 806, the keyboard may determine whether keyboard data (e.g., data regarding keys pressed status of the wireless keyboard) is ready to send. If keyboard data is ready to send, the keyboard may proceed to 816. If keyboard data is not ready to send, the keyboard may proceed to 820.

At 816, the keyboard may send keyboard data to the dongle. At 822, the keyboard may set a flag for waiting acknowledgment to the keyboard data. At 820, the keyboard may set RF to idle at the second time slot.

At 804, the keyboard may determine whether a beacon is received. If a beacon is received, the keyboard may proceed to 812. If a beacon is not received, the keyboard may proceed to 810.

At 812, the keyboard may perform a connection sequence to connect to the dongle. At 814, the keyboard is connected to the dongle. At 810, the keyboard may listen for beacon data.

Figure 9:
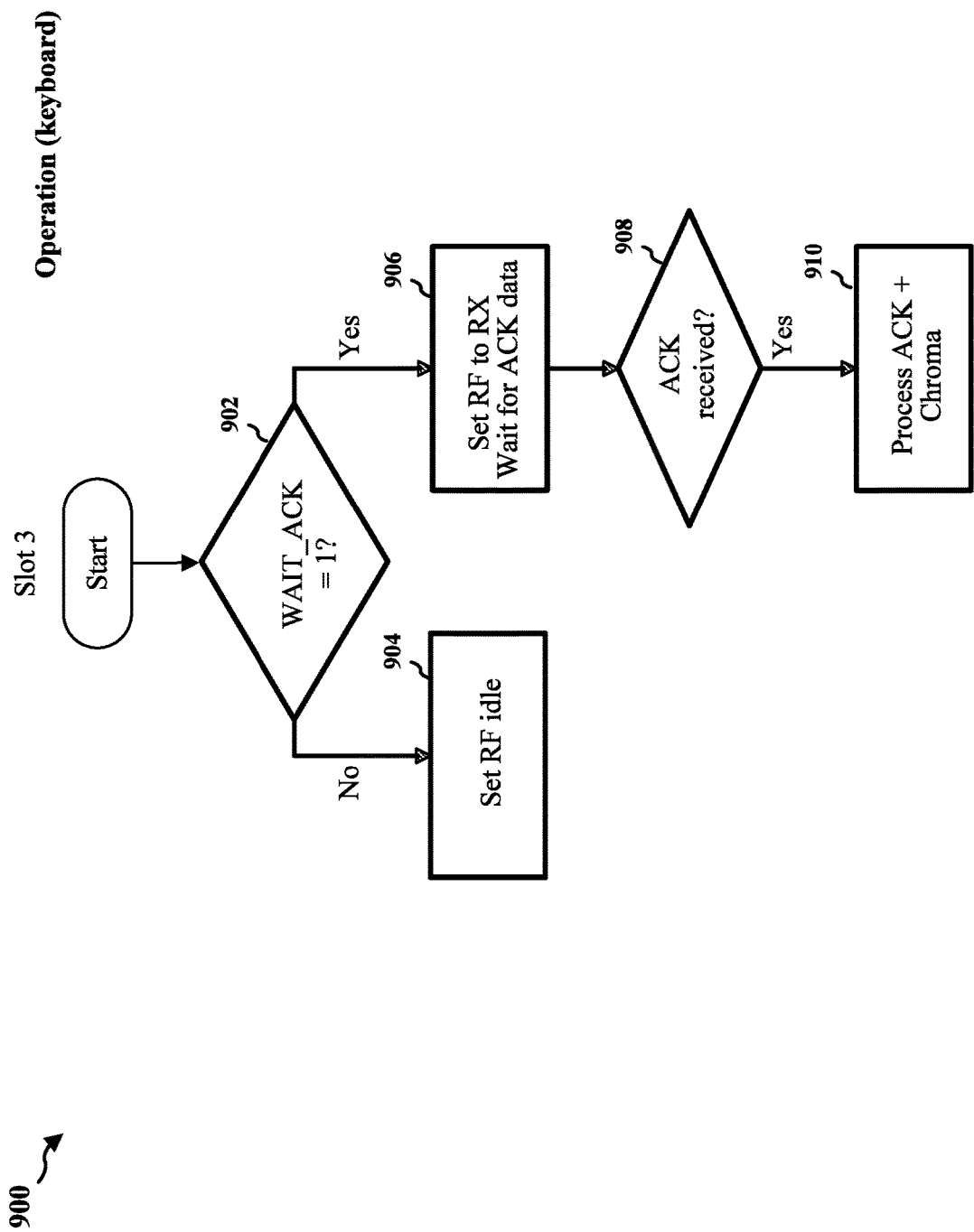
FIG. 9 is a flowchart of a method of operating a wireless keyboard at the third time slot in the data transmission system described above in FIG. 2.

FIG. 9 is a flowchart 900 of a method of operating a wireless keyboard at the third time slot in the data transmission system described above in FIG. 2. The method may be performed by the wireless keyboard.

At 902, the keyboard may determine whether the flag for waiting acknowledgment is set. If the flag for waiting acknowledgment is set, the keyboard may proceed to 906. If the flag for waiting acknowledgment is not set, the keyboard may proceed to 904.

At 906, the keyboard may set RF to receive mode and wait for the acknowledgment data. At 908, the keyboard may determine whether acknowledgment is received. If acknowledgment is received, the keyboard may proceed to 910. At 910, the keyboard may process the received acknowledgment and Chroma data for the keyboard. At 904, the keyboard may set RF to idle at the third time slot.

Figure 10:
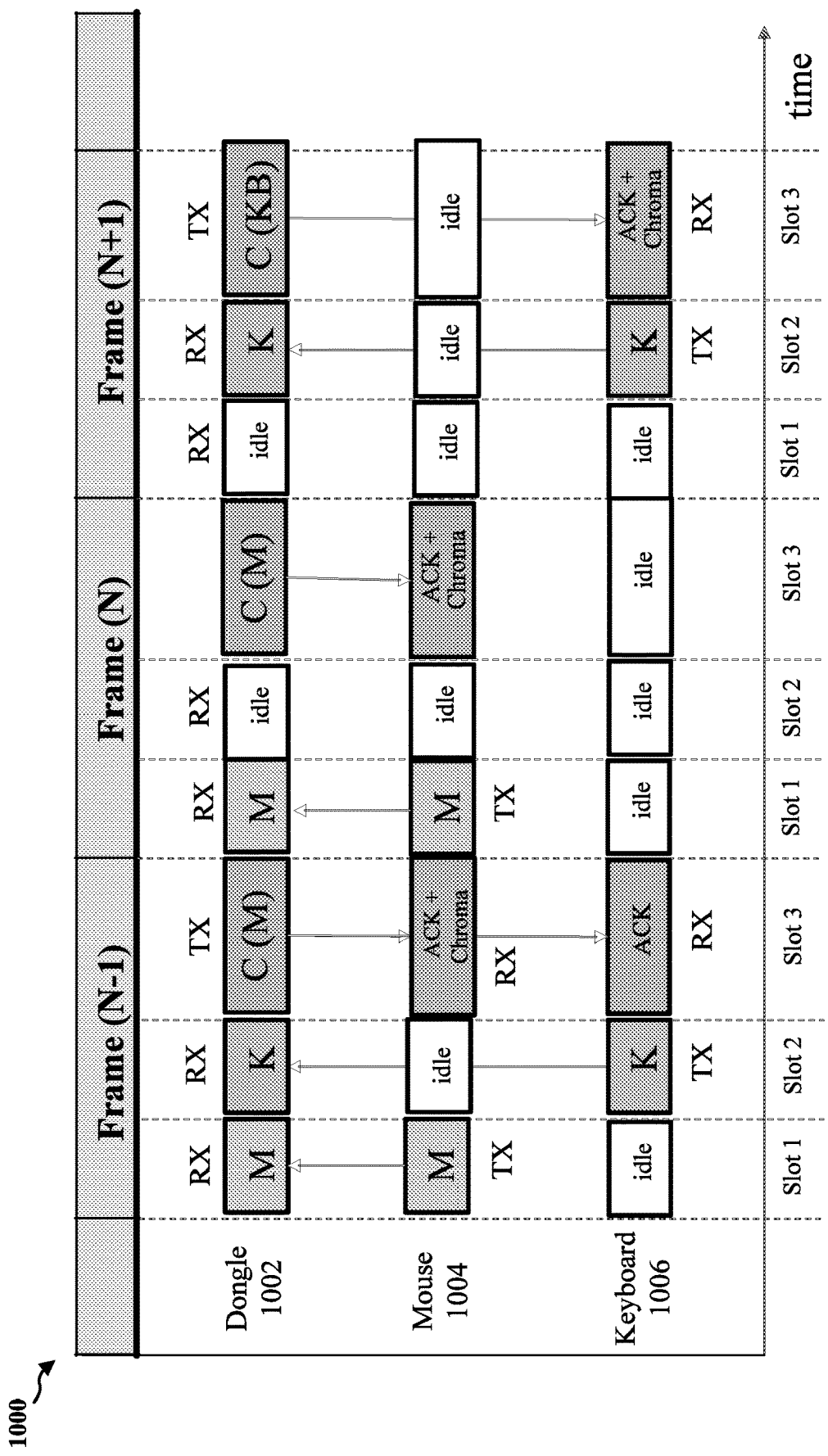
FIG. 10 is a diagram illustrating an example of data transmissions between a dongle, a mouse, and a keyboard.

FIG. 10 is a diagram 1000 illustrating an example of data transmissions between a dongle 1002, a mouse 1004, and a keyboard 1006. The mouse 1004 may be a wireless mouse and the keyboard 1006 may be a wireless keyboard. In some embodiments, the data transmissions in the example may occur in the data transmission system described above with reference to FIG. 2.

At frame (N−1), both the mouse 1004 and the keyboard 1006 have HID data to transmit to the dongle 1002. At frame (N−1), slot 1, the mouse 1004 transmits HID data to the dongle 1002. At frame (N−1), slot 2, the keyboard 1006 transmits HID data to the dongle 1002.

At frame (N−1), slot 3, the mouse 1004 and the keyboard 1006 change to RX mode. The dongle 1002 transmits ACK to the mouse 1004 and the keyboard 1006, as well as Chroma data to the mouse 1004. The mouse 1004 receives ACK, which indicates the success of previous HID transmission. The mouse 1004 also receives the Chroma data to configure the lighting effect of the mouse 1004. The keyboard 1006 receives ACK, which indicate the success of previous HID transmission.

At frame (N), only the mouse 1004 has HID data to transmit. At frame (N), slot 1, the mouse 1004 transmits HID data to the dongle 1002. At frame (N), slot 2, no transmission from the keyboard 1006. The keyboard 1006 is placed in idle mode. At frame (N), slot 3, the mouse 1004 changes to RX mode. The dongle 1002 transmits ACK to the mouse 1004, as well as Chroma data to the mouse 1004. The mouse 1004 receives ACK, which indicate the success of previous HID transmission. The mouse 1004 also receives Chroma data to configure the lighting effect of the mouse 1004.

At frame (N+1), only the keyboard 1006 has HID data to transmit. At frame (N+1), slot 1, no transmission from the mouse 1004. The mouse 1004 is placed in idle mode. At frame (N+1), slot 2, the keyboard 1006 transmits HID data to the dongle 1002. At frame (N+1), slot 3, the keyboard 1006 changes to RX mode. The dongle 1002 transmits ACK to the keyboard 1006, as well as Chroma data to the keyboard 1006. The keyboard 1006 receives ACK, which indicate the success of previous HID transmission. The keyboard 1006 also receives Chroma data to configure the lighting effect of the keyboard 1006.

In some embodiments, one single RF channel may be used instead of a subset of sub-carrier frequency. In some embodiments, a single wireless protocol is deployed. In some embodiments, the dongle (receiver) may control the time slots, and both mouse and keyboard may be synchronized to the dongle. The packet transmission is time slot base instead of contention base.

In some embodiments, the synchronization is controlled by the dongle. The dongle may transmit a beacon on each time slot upon power up (before the respective HID device is connected). The HID device (e.g., mouse, keyboard) may listen for beacon upon power up. The address of each beacon may be assigned according to the time slot assignment. In another words, mouse may only receive mouse beacon, whereas keyboard may only receive keyboard beacon. So the beacons for different HID devices may not mix up and compete for the same timeslot. Once the mouse (or keyboard) receives the beacon, it may perform the connection process with the dongle using the beacon as the reference for the time slot synchronization.

In some embodiments, the duration of a frame may be 500 µs (microsecond). Each frame may include at least three time slots. The time slot for mouse and keyboard may be 150 µs each. And the time slot for Chroma data may be 200 µs. Frame duration of 500 µs may provide a frame rate of 2000 Hz. The minimum frame rate for a HID device is 1000 Hz. So there may be 100% redundancy for error recovery. The 150 µs time slot for mouse and keyboard may be determined by the packet size of each transmission. Each mouse or keyboard packet may include 8 bytes of data. Thus, a 150 µs time slot may be sufficient to complete the data transmission. And the remaining time slot may be assigned to Chroma data.

Figure 11:
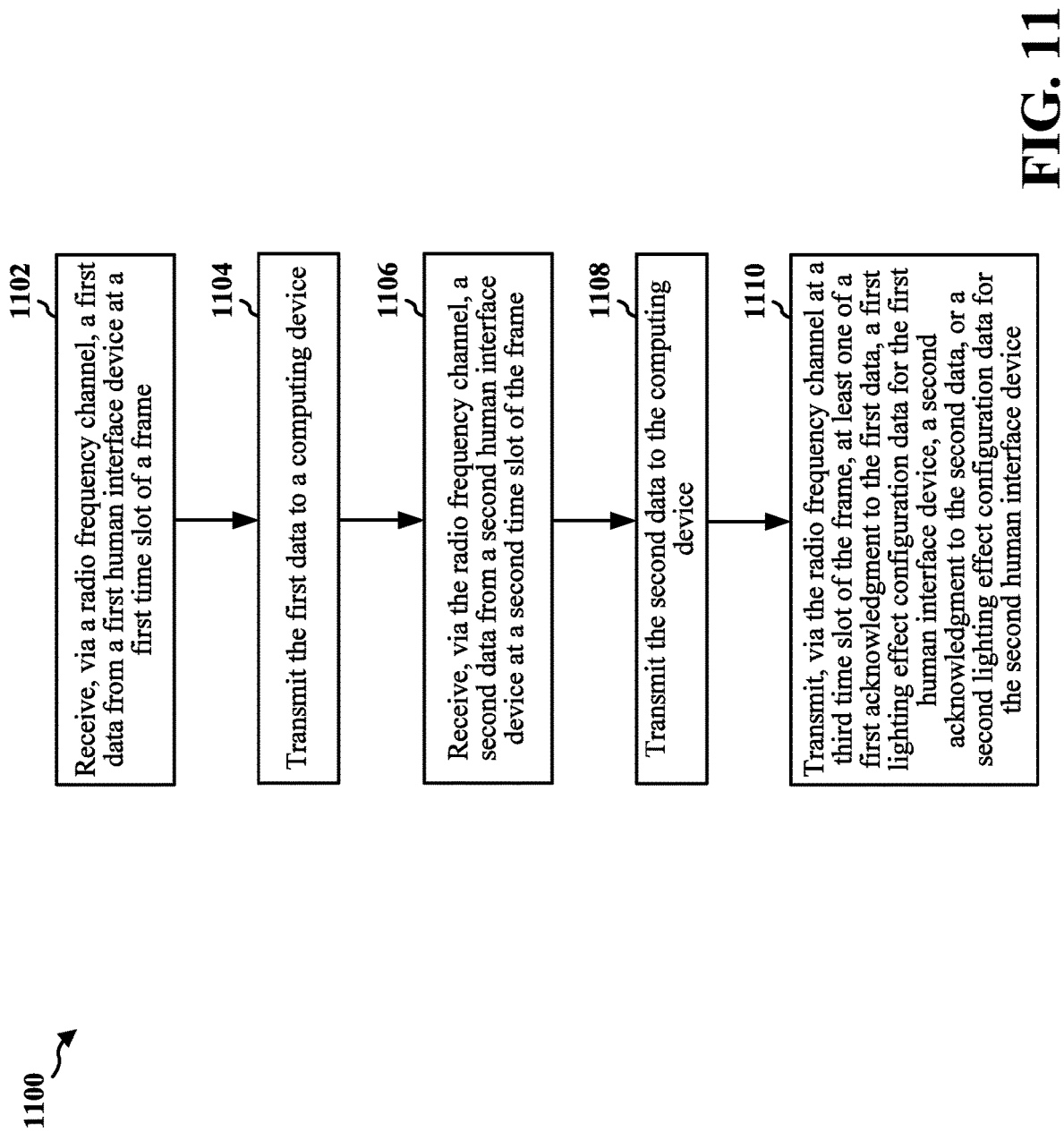
FIG. 11 is a flowchart of a method of wireless communication.

FIG. 11 is a flowchart 1100 of a method of wireless communication. In some embodiments, the method may operate a dongle in the data transmission system described above with reference to FIG. 2. The method may be performed by an apparatus (e.g., apparatus 1202/1202' described below with reference to FIG. 12 or 13). The apparatus may be a dongle. At 1102, the apparatus may receive, via a radio frequency channel, a first data from a first human interface device at a first time slot of a frame.

At 1104, the apparatus may transmit the first data to a computing device coupled to the apparatus. In some embodiments, the apparatus may be coupled to the computing device through a USB port of the computing device.

At 1106, the apparatus may receive, via the radio frequency channel, a second data from a second human interface device at a second time slot of the frame. In some embodiments, the first human interface device and the second human interface device may be a wireless mouse and a wireless keyboard.

In some embodiments, both the first human interface device and the second human interface device may be synchronized to the apparatus. In some embodiments, the apparatus may transmit, at the first time slot, a first beacon to synchronize with the first human interface device. The apparatus may further transmit, at the second time slot, a second beacon to synchronize with the second human interface device.

At 1108, the apparatus may transmit the second data to the computing device. In some embodiments, the first data may include movement and button status of the wireless mouse. In some embodiments, the second data may include keys pressed status of the wireless keyboard.

At 1110, the apparatus may transmit, via the radio frequency channel at a third time slot of the frame, at least one of a first acknowledgment to the first data, a first lighting effect configuration data for the first human interface device, a second acknowledgment to the second data, or a second lighting effect configuration data for the second human interface device. In some embodiments, the first lighting effect configuration data may be used to configure lighting effect of the first human interface device. In some embodiments, the second lighting effect configuration data may be used to configure lighting effect of the second human interface device.

Figure 12:
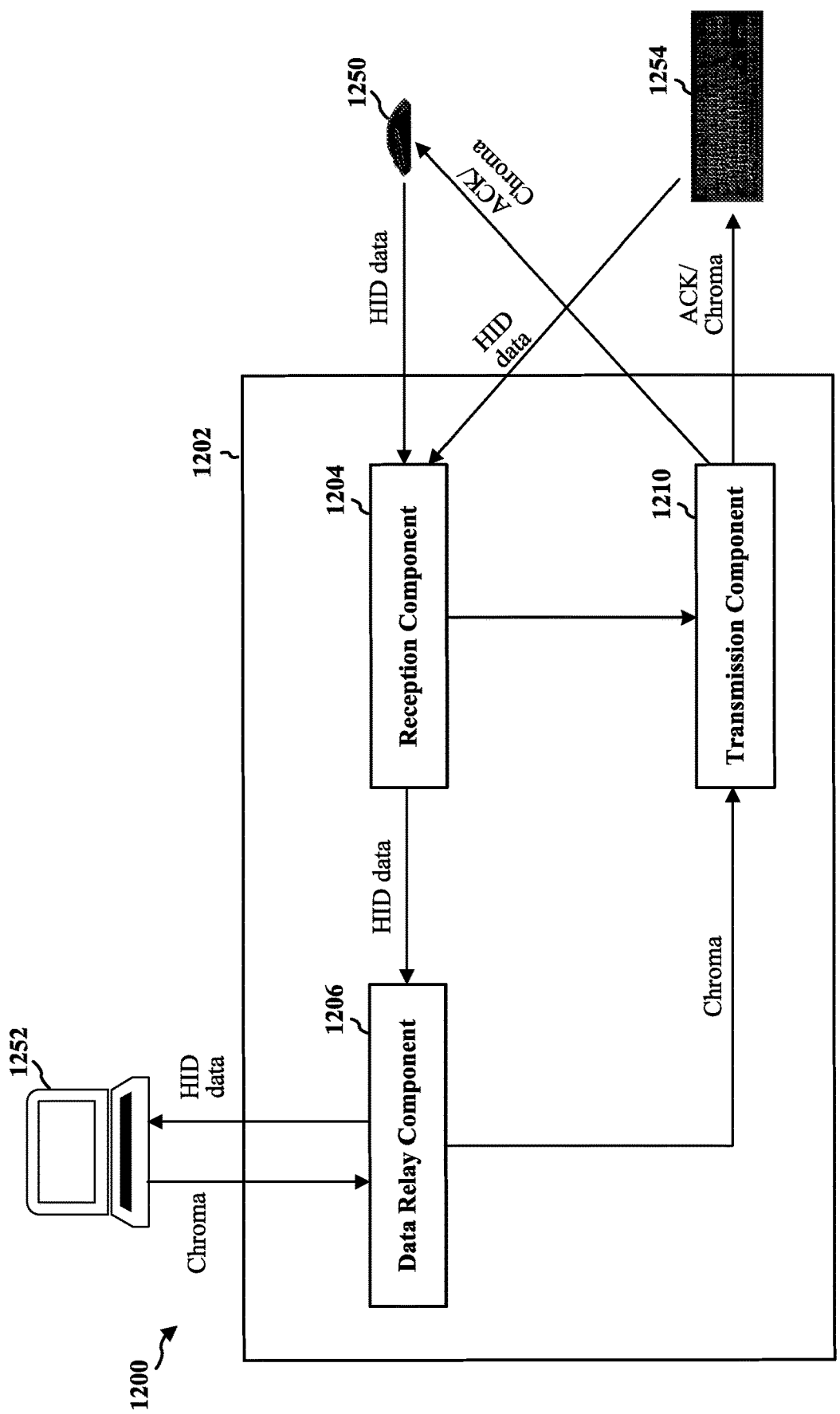
FIG. 12 is a conceptual data flow diagram illustrating the data flow between different means/components in an exemplary apparatus.

FIG. 12 is a conceptual data flow diagram 1200 illustrating the data flow between different means/components in an exemplary apparatus 1202. The apparatus 1202 may be a dongle (e.g., the dongle 158 or 1002). The apparatus 1202 may include a reception component 1204 that receives HID data from HID devices 1250 (e.g., a wireless mouse) and 1254 (e.g., a wireless keyboard). In one embodiment, the reception component 1204 may perform the operations described above with reference to 1102 or 1106 in FIG. 11.

The apparatus 1202 may include a transmission component 1210 that transmits ACK and Chroma data to HID device 1250 and/or 1254. In one embodiment, the transmission component 1210 may perform the operations described above with reference to 1110 in FIG. 11. The reception component 1204 and the transmission component 1210 may collaborate to coordinate the communication of the apparatus 1202.

The apparatus 1202 may include a data relay component 1206 that is configured to relay HID data from the reception component 1204 to a computing device 1252. The relay component 1206 may be further configured to relay Chroma data from the computing device 1252 to the transmission component 1210. In one embodiment, the data relay component 1206 may perform the operations described above with reference to 1104 or 1108 in FIG. 11.

The apparatus 1202 may include additional components that perform each of the blocks of the algorithm in the aforementioned flowcharts of FIGS. 3-5 and 11. As such, each block in the aforementioned flowcharts of FIGS. 3-5 and 11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

FIG. 13 is a diagram 1300 illustrating an example of a hardware implementation for an apparatus 1202' employing a processing system 1314. In one embodiment, the apparatus 1202' may be the apparatus 1202 described above with reference to FIG. 12. The processing system 1314 may be implemented with a bus architecture, represented generally by the bus 1324. The bus 1324 may include any number of interconnecting buses and bridges depending on the specific application of the processing system 1314 and the overall design constraints. The bus 1324 links together various circuits including one or more processors and/or hardware components, represented by the processor 1304, the components 1204, 1206, 1210, and the computer-readable medium/memory 1306. The bus 1324 may also link various other circuits such as timing sources, peripherals, voltage regulators, and power management circuits, which are well known in the art, and therefore, will not be described any further.

The processing system 1314 may be coupled to a transceiver 1310. The transceiver 1310 is coupled to one or more antennas 1320. The transceiver 1310 provides a means for communicating with various other apparatus over a transmission medium. The transceiver 1310 receives a signal from the one or more antennas 1320, extracts information from the received signal, and provides the extracted information to the processing system 1314, specifically the reception component 1204. In addition, the transceiver 1310 receives information from the processing system 1314, specifically the transmission component 1210, and based on the received information, generates a signal to be applied to the one or more antennas 1320.

The processing system 1314 includes a processor 1304 coupled to a computer-readable medium/memory 1306. The processor 1304 is responsible for general processing, including the analyzation of data gathered by the apparatus itself through its own sensors and the execution of software stored on the computer-readable medium/memory 1306. The software, when executed by the processor 1304, causes the processing system 1314 to perform the various functions described supra for any particular apparatus. The computer-readable medium/memory 1306 may also be used for storing data that is manipulated by the processor 1304 when executing software. The processing system 1314 further includes at least one of the components 1204, 1206, 1210. The components may be software components running in the processor 1304, resident/stored in the computer readable medium/memory 1306, one or more hardware components coupled to the processor 1304, or some combination thereof.

In the following, various aspects of this disclosure will be illustrated:

Example 1 is a method or apparatus for wireless communication. The apparatus may receive, via a radio frequency channel, a first data from a first human interface device at a first time slot of a frame. The apparatus may transmit the first data to a computing device coupled to the apparatus. The apparatus may receive, via the radio frequency channel, a second data from a second human interface device at a second time slot of the frame. The apparatus may transmit the second data to the computing device. The apparatus may transmit, via the radio frequency channel at a third time slot of the frame, at least one of a first acknowledgment to the first data, a first lighting effect configuration data for the first human interface device, a second acknowledgment to the second data, or a second lighting effect configuration data for the second human interface device.

In Example 2, the subject matter of Example 1 may optionally include that the first human interface device and the second human interface device may be a wireless mouse and a wireless keyboard.

In Example 3, the subject matter of Example 2 may optionally include that the first data may include movement and button status of the wireless mouse.

In Example 4, the subject matter of Example 2 may optionally include that the second data may include keys pressed status of the wireless keyboard.

In Example 5, the subject matter of any one of Examples 1 to 4 may optionally include that the first lighting effect configuration data may be used to configure lighting effect of the first human interface device.

In Example 6, the subject matter of any one of Examples 1 to 5 may optionally include that the second lighting effect configuration data may be used to configure lighting effect of the second human interface device.

In Example 7, the subject matter of any one of Examples 1 to 6 may optionally include that both the first human interface device and the second human interface device may be synchronized to the apparatus.

In Example 8, the subject matter of any one of Examples 1 to 7 may optionally include that the apparatus may transmit, at the first time slot, a first beacon to synchronize with the first human interface device; and may transmit, at the second time slot, a second beacon to synchronize with the second human interface device.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication, the method comprising:
   receiving, at a dongle via a radio frequency channel, a first data from a first human interface device at a first time slot of a frame;
   transmitting the first data to a computing device coupled to the dongle;
   receiving, at the dongle via the radio frequency channel, a second data from a second human interface device at a second time slot of the frame;
   transmitting the second data to the computing device; and
   transmitting, by the dongle via the radio frequency channel at a third time slot of the frame, a first acknowledgment to the first data and a first lighting effect configuration data for the first human interface device, a second acknowledgment to the second data and a second lighting effect configuration data for the second human interface device.

2. The method of claim 1, wherein the first human interface device and the second human interface device are a wireless mouse and a wireless keyboard.

3. The method of claim 2, wherein the first data comprises movement and button status of the wireless mouse.

4. The method of claim 2, wherein the second data comprises keys pressed status of the wireless keyboard.

5. The method of claim 1, wherein the first lighting effect configuration data is used to configure lighting effect of the first human interface device.

6. The method of claim 1, wherein the second lighting effect configuration data is used to configure lighting effect of the second human interface device.

7. The method of claim 1, wherein both the first human interface device and the second human interface device are synchronized to the dongle.

8. The method of claim 1, further comprising:
   transmitting, by the dongle at the first time slot, a first beacon to synchronize with the first human interface device; and
   transmitting, by the dongle at the second time slot, a second beacon to synchronize with the second human interface device.

9. An apparatus for wireless communication, the apparatus comprising:
   a memory; and
   at least one processor coupled to the memory and configured to:
      receive, via a radio frequency channel, a first data from a first human interface device at a first time slot of a frame;
      transmit the first data to a computing device coupled to the apparatus;
      receive, via the radio frequency channel, a second data from a second human interface device at a second time slot of the frame;
      transmit the second data to the computing device; and transmit, via the radio frequency channel at a third time slot of the frame, at a first acknowledgment to the first data and a first lighting effect configuration data for the first human interface device, a second acknowledgment to the second data and a second lighting effect configuration data for the second human interface device.

10. The apparatus of claim 9, wherein the first human interface device and the second human interface device are a wireless mouse and a wireless keyboard.

11. The apparatus of claim 10, wherein the first data comprises movement and button status of the wireless mouse.

12. The apparatus of claim 10, wherein the second data comprises keys pressed status of the wireless keyboard.

13. The apparatus of claim 9, wherein the first lighting effect configuration data is used to configure lighting effect of the first human interface device.

14. The apparatus of claim 9, wherein the second lighting effect configuration data is used to configure lighting effect of the second human interface device.

15. The apparatus of claim 9, wherein both the first human interface device and the second human interface device are synchronized to the apparatus.

16. The apparatus of claim 9, wherein the at least one processor is further configured to:
   transmit, at the first time slot, a first beacon to synchronize with the first human interface device; and
   transmit, at the second time slot, a second beacon to synchronize with the second human interface device.

17. A non-transitory computer-readable medium storing computer executable code, comprising instructions for:
   receiving, at a dongle via a radio frequency channel, a first data from a first human interface device at a first time slot of a frame;
   transmitting the first data to a computing device coupled to the dongle;
   receiving, at the dongle via the radio frequency channel, a second data from a second human interface device at a second time slot of the frame;
   transmitting the second data to the computing device; and
   transmitting, by the dongle via the radio frequency channel at a third time slot of the frame, a first acknowledgment to the first data and a first lighting effect configuration data for the first human interface device, a second acknowledgment to the second data and a second lighting effect configuration data for the second human interface device.

18. The non-transitory computer-readable medium of claim 17, wherein the first human interface device and the second human interface device are a wireless mouse and a wireless keyboard.

19. The non-transitory computer-readable medium of claim 18, wherein the first data comprises movement and button status of the wireless mouse, wherein the second data comprises keys pressed status of the wireless keyboard.

20. The non-transitory computer-readable medium of claim 17, wherein the first lighting effect configuration data is used to configure lighting effect of the first human interface device, wherein the second lighting effect configuration data is used to configure lighting effect of the second human interface device.

* * * * *